May 29, 1923.

W. G. FRANKE

CONDUIT OUTLET BOX

Filed Dec. 15, 1919

1,456,792

Inventor
William G. Franke,
By
Attorneys

Patented May 29, 1923.

1,456,792

UNITED STATES PATENT OFFICE.

WILLIAM G. FRANKE, OF DETROIT, MICHIGAN.

CONDUIT-OUTLET BOX.

Application filed December 15, 1919. Serial No. 344,983.

*To all whom it may concern:*

Be it known that I, WILLIAM G. FRANKE, a citizen of Germany, residing at Detroit, in the county of Wayne and State of Michigan, have invented certain new and useful Improvements in Conduit-Outlet Boxes, of which the following is a specification, reference being had therein to the accompanying drawings.

The primary object of my invention is to provide a sectional conduit outlet box which has its sections constructed so that one of said sections may provide a connecting member for the ends of conduits or pipes, to maintain the conduits or pipes in proximity to each other and support the same, particularly when the supporting means of said conduits or pipes is not adjacent the outlet box, while the other section of the box is detachable and affords an opening of a maximum area to the box, so that electrical connections can be conveniently established within the box while it is held by the confronting ends of the conduits or pipes.

A further object of my invention is to provide a strong, durable and inexpensive outlet box that may be constructed to afford a plurality of connections some of which may aline and others of which may be at an angle to each other. In either instance the greater part of the outlet box is supported while electrical connections are being established, and the construction of the box contributes to such electrical connections being expeditiously and safely made.

The above and other objects are attained by a mechanical construction that will be hereinafter specifically described and then claimed, and reference will now be had to the drawings, wherein Figure 1 is a side elevation of a three-way or T outlet box, partly broken away;

Figure 1:
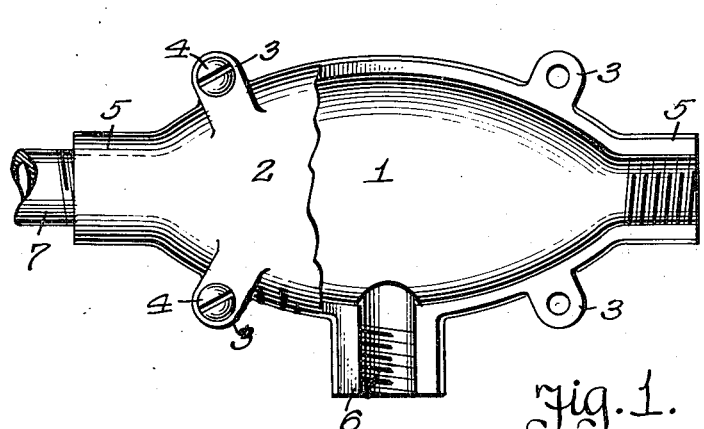

The outlet box is composed of a stationary section 1 and a detachable section 2, said sections when connected providing an oblong or bulb like enclosure in which electrical wires may be connected and the connections maintained without any danger of disconnection or interference when the sections of the box are connected together. The sections 1 and 2 have apertured lugs 3, at the confronting edges thereof connected by screws 4 or other fastening means, and the sections are formed with conduits or pipe connections 5 and 6 which are interiorly screwthreaded so as to receive conduits or pipes 7. As shown in Fig. 1, the connection 6 is intermediate the ends of the box and disposed at a right angle to the axis of the connections 5, such structure being commonly known as a T outlet box.

Figure 2:
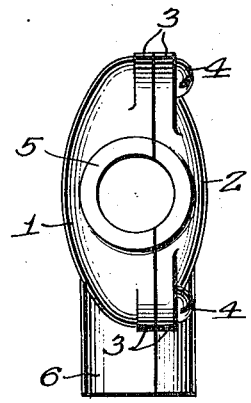
Fig. 2 is an end view of the same.

In designing the sections 1 and 2 of the outlet box, said sections have the confronting edges thereof in a vertical plane and the plane of the meeting edges is set to one side or in advance of the plane of the axis of the connections 5, as best shown in Fig. 2, so that the connection parts of the section 1 will be greater than the connection parts of the section 2, that is, instead of the connection parts being equal and semi-cylindrical, the connection parts of the section 1 are approximately 190 degrees in circumference, thus providing sockets into which the conduits or pipes 7 may be screwed, whereby the conduits or pipes 7 will support the section 1 when the section 2 is detached. This would not be possible if the connection parts were semi-cylindrical, as both sections would fall away from the conduits or pipes 7 and thus render it very difficult for an artisan to assemble the outlet box about electrical connections established at the ends of the conduits or pipes 7. With the section 1 positively held by the conduits or pipes 7 and the section 2 removed, it is possible for the electrician or artisan to establish desired electrical connections within the section 1 and then place the section 2 in position to close the outlet box.

Figure 3:
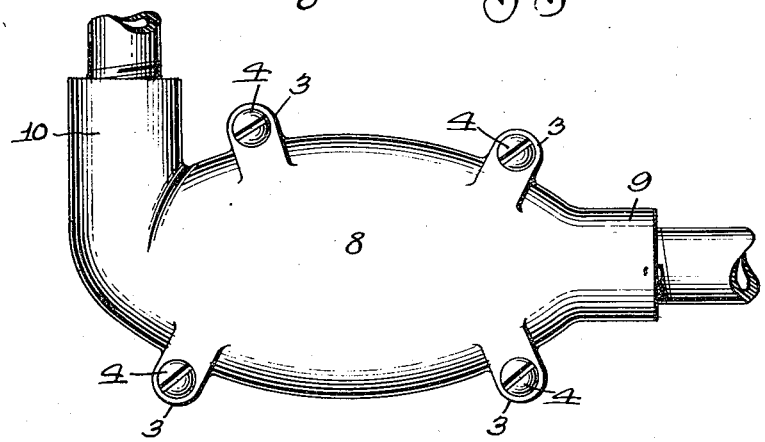
Fig. 3 is a side elevation of a two-way or angle outlet box.
Figure 4:
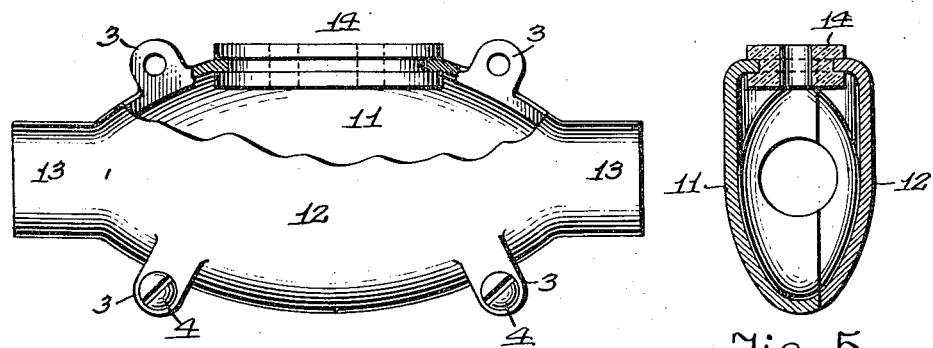
Fig. 4 is a side elevation of a straight-way outlet box, partly broken away and partly in section to show that said box may be supported by an insulator.
Figure 5:
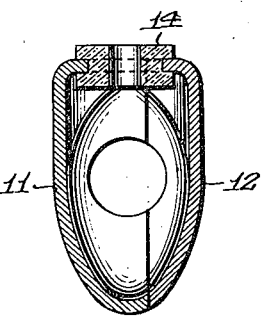
Fig. 5 is a cross sectional view of the same.

As shown in Fig. 3 the outlet box generally designated 8 may have a longitudinal connection 9 and an angularly disposed connection 10, and as shown in Figs. 4 and 5 the outlet box sections 11 and 12 have straightway or longitudinal connections 13. The box parts 11 and 12 have the upper confronting edges thereof cut away to provide clearance for an insulator 14 which will accommodate suitable fastening means to permit of the outlet box being attached to a ceiling or other support. The insulator 14 may be set in a mold used for producing the box part 11 so that when the box part is molded the insulator will be anchored in the edge of the box part.

The outlet box sections 11 and 12 are designed similar to the outlet box sections 1 and 2 and the insulator 14 will not become accidentally displaced when the box section 12 is removed.

Either form of the outlet box may be molded or otherwise made from a suitable composition possessing insulating qualities, or the box may have its parts stamped and pressed from sheet metal, and while in the drawings, there are illustrated the preferred embodiments of my invention, it is to be understood that the structural elements are susceptible to such variations and modifications as fall within the scope of the appended claim.

What I claim is:—

An outlet box comprising a stationary section having partially completed pipe sockets by which said section may be supported, a detachable section adapted to close the stationary section and complete the pipe sockets, said sections having connected confronting edges in a plane to one side of the central vertical plane of the box so that the stationary section of said box may be supported by pipes when the detachable section is removed, means independent of said pipe sockets and spaced therefrom connecting said sections, and an insulator anchored by an edge of the stationary section and into which insulator the edge of the detachable section may extend.

In testimony whereof I affix my signature in the presence of two witnesses.

WILLIAM G. FRANKE.

Witnesses:
KARL H. BUTLER,
ANNA M. DORR.